United States Patent
Sarkar et al.

(10) Patent No.: US 9,200,615 B2
(45) Date of Patent: Dec. 1, 2015

(54) VERTICAL AXIS WIND TURBINE USING HELICAL BLADES WITH SERRATED EDGES

(71) Applicants: Shyam Sundar Sarkar, Fremont, CA (US); Ayush Sarkar, Fremont, CA (US)

(72) Inventors: Shyam Sundar Sarkar, Fremont, CA (US); Ayush Sarkar, Fremont, CA (US)

(*) Notice: Subject to any disclaimer, the term of this patent is extended or adjusted under 35 U.S.C. 154(b) by 344 days.

(21) Appl. No.: 13/851,429

(22) Filed: Mar. 27, 2013

(65) Prior Publication Data

US 2014/0294588 A1  Oct. 2, 2014

(51) Int. Cl.
  *F03D 3/00* (2006.01)
  *F03D 3/02* (2006.01)
  *F03D 3/06* (2006.01)

(52) U.S. Cl.
  CPC *F03D 3/02* (2013.01); *F03D 3/061* (2013.01); *F03D 3/062* (2013.01); *F05B 2250/25* (2013.01); *Y02E 10/74* (2013.01)

(58) Field of Classification Search
  CPC ............ F03D 3/00; F03D 3/005; Y02E 10/74
  See application file for complete search history.

(56) References Cited

U.S. PATENT DOCUMENTS

| | | | |
|---|---|---|---|
| 4,500,259 A * | 2/1985 | Schumacher | 416/122 |
| 4,953,633 A * | 9/1990 | Hermans | 165/109.1 |
| D338,871 S * | 8/1993 | Carfagno | D13/115 |
| 6,740,989 B2 | 5/2004 | Rowe | |
| 7,109,599 B2 | 9/2006 | Watkins | |
| 7,780,416 B2 | 8/2010 | Al-Azzawi | |
| 8,157,501 B2 | 4/2012 | Semov | |
| 8,337,150 B2 | 12/2012 | Chapman | |
| 8,354,756 B2 | 1/2013 | Ellis | |
| 2005/0263057 A1* | 12/2005 | Green | 114/102.1 |
| 2008/0187432 A1* | 8/2008 | Cowan | 415/4.4 |
| 2010/0270808 A1* | 10/2010 | Bates et al. | 290/55 |
| 2011/0062717 A1* | 3/2011 | Price, Jr. | 290/55 |
| 2011/0081243 A1* | 4/2011 | Sullivan | 416/120 |
| 2012/0134824 A1* | 5/2012 | Agtuca | 416/142 |

* cited by examiner

*Primary Examiner* — Christopher Harmon

(57) ABSTRACT

A vertical-axis wind turbine system includes a novel wind turbine having helical shaped blades with serrated edges that exhibit unique airfoil characteristics. Such innovative designs of blades improve the efficiency of the turbine. Airfoil characteristics of such blades make it effective at lower wind speeds than conventional wind turbines. The exemplary system is expandable for more efficiency when the number of turns in the helical shape of blades is increased. Such a design of blades in a wind turbine generate airflow and drag in the upward direction affecting other wind turbine(s) located vertically above in close proximity. This system is modularized with many smaller wind turbines sharing the same vertical axis arranged one above another in close proximity to each other. Such an incremental design of modularized wind turbines is uniquely used to scale up for increased power generation needs.

3 Claims, 4 Drawing Sheets

VERTICAL AXIS WIND TURBINE USING HELICAL BLADES WITH SERRATED EDGES

FIELD OF THE INVENTION

A wind turbine is a device that converts wind energy, into mechanical energy; a process known as wind power. When the wind power is converted into electricity, the device may be called wind turbine or wind power plant. The wind turbines are manufactured in a wide range of vertical and horizontal axis types. Large grid-connected arrays of turbines are becoming an increasingly important source of wind power-produced commercial electricity.

The invention has particular application to methods and apparatus for harvesting wind energy to produce electric power using vertical axis of rotation and a cylindrical rotor.

Vertical-axis wind turbines have the main rotor shaft arranged vertically. Key advantages of this arrangement are that the turbine does not need to be pointed into the wind to be effective. This is an advantage on sites where the wind direction is highly variable, for example when integrated into buildings. With a vertical axis, the generator and gearbox can be placed near the ground, using a direct drive from the rotor assembly to the ground-based gearbox, hence improving accessibility for maintenance.

BACKGROUND OF THE INVENTION

A principal challenge for all forms of renewable energy is that their sources—solar radiation or wind, for example are more diffuse than fossil fuels. As a result, existing renewable energy technologies require substantial land resources in order to extract reasonable quantities of energy. Conventional propeller-style wind turbines (i.e., horizontal axis wind turbines) must be spaced far apart in order to avoid aerodynamic interference caused by interactions with the wakes of adjacent turbines. Wind turbines whose airfoil blades rotate around a vertical axis (i.e., vertical-axis wind turbines) have the potential to achieve higher power densities than horizontal axis wind turbines. This possibility arises in part because the swept area of a vertical axis wind turbine rotor (i.e., the cross-sectional area that interacts with the wind) need not be equally apportioned between its breadth which determines the size of its footprint and its height.

The prior art includes two vertical axis wind turbine (VAWT) designs.

One of them is the Savonius turbine being one of the simplest turbines. Aerodynamically, it is a drag-type device, consisting of two or three scoops. Looking down on the rotor from above, a two-scoop machine would look like an "S" shape in cross section. Because of the curvature, the scoops experience less drag when moving against the wind than when moving with the wind. The differential drag causes the Savonius turbine to spin.

Another form is the Darrieus turbine. In this apparatus, the airfoils are arranged so that they are symmetrical and have zero rigging angle, that is, the angle that the airfoils are set relative to the structure on which they are mounted. This arrangement is equally effective no matter which direction the wind is blowing compared to the conventional type, which must be rotated to face into the wind.

Wind turbines are designed to exploit the wind energy that exists at a location. Aerodynamic modeling is used to determine the optimum tower height, control systems, number of blades and blade shape. Wind turbines convert wind energy to electricity for distribution. Conventional horizontal axis turbines can be divided into three components. First the rotor component, which is approximately 20% of the wind turbine cost, includes the blades for converting wind energy to low speed rotational energy. Second the generator component, which is approximately 34% of the wind turbine cost, includes the electrical generator, the control electronics, and a gearbox component for converting the low speed incoming rotation to high speed rotation suitable for generating electricity. Finally, the structural support component, which is approximately 15% of the wind turbine cost, includes the tower and rotor yaw mechanism.

The present invention is fundamentally different from current practices in wind energy harvesting. This invention has the potential to concurrently alleviate many of the practical challenges associated with large horizontal axis wind turbines. The challenges are the cost and logistics of their manufacture, transportation, and installation, environmental impacts (e.g., bird and bat strikes); acoustic and radar signatures, visual signature, and general acceptance by local communities. These issues, although not strictly scientific, limit the further expansion of current wind energy technology. Current wind turbine systems are not modular and they are not expandable.

The present invention has addressed the needs for commercially viable wind turbine systems that are suitable for regions with dense population. It addresses the need for solutions in regions having lower average wind speeds. It also addressed the needs for visually appealing, quieter, modular and highly expandable solutions.

BRIEF SUMMARY OF THE INVENTION

The present invention deals with exemplary vertical-axis wind turbine systems, components, and related methods. This invention includes a novel wind turbine having helical blades with serrated edges that exhibit unique characteristics of airfoils. The characteristics of airfoils stacked up with incremental angular shifts for constructing a helical blade improve the efficiency of the turbine. Such blade designs make it effective at lower wind speeds than conventional wind turbines. These innovative designs make the system more expandable with more efficiency as the number of 180 degrees turns in a stack of airfoils is increased for each helical blade. The exemplary system, which is compact and suitable for roof-top and other installations, shields it from birds and flying debris. The system has a power ring that includes a plurality of electromagnets disposed thereon and the apparatus further includes stationary structure configured and positioned for electricity generation as the power ring rotates.

The exemplary system further allows such a vertical axis wind turbine to be configured and installed as a single module sharing a central axis of rotation with plurality of smaller modules of vertical axis wind turbines. This kind of unique modular arrangements leads to an expandable and maintainable system of vertical axis wind turbines influencing rotational speed of each other increasing efficiency of the overall system thereof.

BRIEF DESCRIPTION OF THE DRAWINGS

The invention will be better understood by reference to the accompanying drawing in which.

DESCRIPTION OF THE PREFERRED EMBODIMENTS

This description, which references the above-identified figures and appended claims, narrates one or more specific embodiments of one or more inventions. These embodiments, offered only to exemplify various inventions, are shown and described in sufficient details to enable those skilled in the art to understand these inventions. Thus, where appropriate to focus deeply on the invention, the description may omit certain information already known to those of skill in the art.

Figure 1:
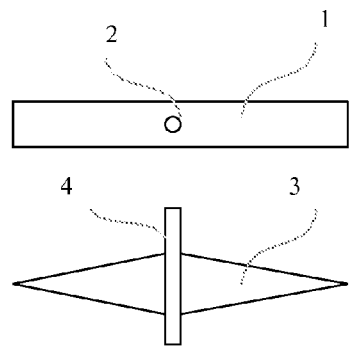
FIG. 1 is a partially schematic top and side view of an airfoil, according to some embodiments.

This invention in a preferred embodiment includes a vertical axis wind turbine with unique design of blades using airfoils. FIG. 1 shows the top view and side view of an airfoil used in the invention. Top view of an airfoil in FIG. 1 includes a rectangular shape (1) with a circular area (2) centered on the geometric centerline of the rectangular area. The circular area (2) represents an axle with a central axis coinciding with central axis of airfoil (1). The side view of the same airfoil in FIG. 1 includes shape (3) with the axle represented by (4). The shape (3) includes the design of two ends of an airfoil smoothly becoming tapered for aerodynamic characteristics described in another embodiment.

Figure 2:
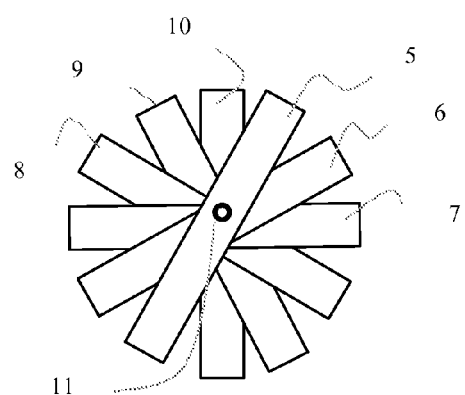
FIG. 2 is a top view of a blade constructed by a stack of airfoils in FIG. 1, according to some embodiments.

In this invention, blades are built with airfoils. Airfoils are stacked up one above another with incremental angular shifts to create an exemplary helical shape of blade with serrated edges. FIG. 2 includes top view of a blade built from many airfoils stacked up one above another with incremental angular shifts around the same central axis. In this figure, rectangular top views of airfoils (5), (6), (7), (8), (9) and (10) are included. These airfoils share the same central axle included as a small circle (11). These airfoils are stacked up one above another and are strongly coupled to the central axle (11). In this figure, airfoil (5) is at the top of the stack. Airfoil (6) comes next in the stack right below (5) and its position has a small angular shift around the central axis from the position of (5). Airfoil (7) sits below (6) with the same angular shift from the position of (6). Airfoils (8), (9) and (10) are similarly placed with same amount of angular shifts from the previous airfoil positions respectively in the stack. The position of last airfoil in the stack matches with the position of the first airfoil in the stack. This position of last airfoil in the stack is at 180 degrees turn with respect to the position of the first airfoil in the stack. It is possible to build such stack of airfoils with multiple of 180 degrees turns using a large number of airfoils. Actual magnitude of angular shift between two successive airfoil positions in a stack depends on aerodynamic design characteristics of a blade and should be anywhere between 5 degrees to 30 degrees.

Figure 3:
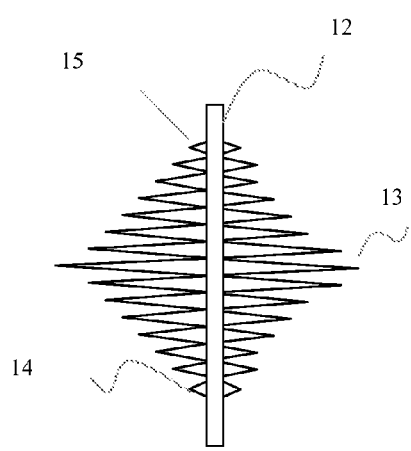
FIG. 3 is a front view of a blade in FIG. 2 with 180 degrees turn, according to some embodiments.

FIG. 3 includes front view of a blade built with a stack of airfoils. The central axle (12) is coupled strongly with all airfoils sharing the central axis in a stack. The airfoil at the bottom of the stack (14) and airfoil at the top of the stack (15) are in perpendicular positions to the plane of the figure whereas the airfoil (13) in the middle of the stack is in parallel position to the plane of the figure. As a result airfoils (14) and (15) appear to have the smallest lengths whereas airfoil (13) appears to have the largest length. All other airfoils from (13) to (14) and from (13) to (15) appear to have diminishing lengths because of increasing angular shifts in positions around the central axis. A blade constructed with the stack of airfoils in FIG. 3 has a helical shape with serrated edges. Such a blade has a 180 degrees turn.

Figure 4:
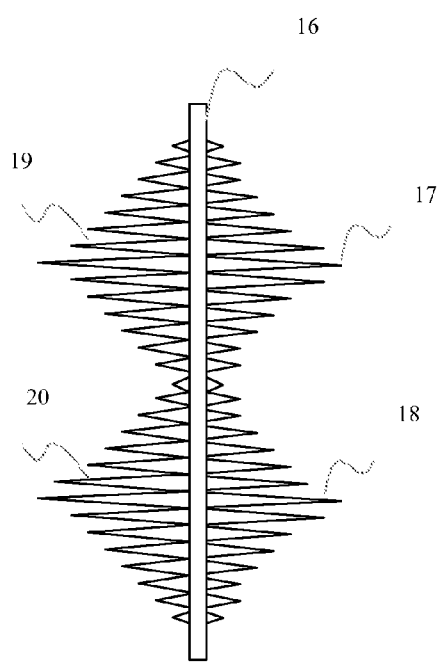
FIG. 4 is a front view of a blade in FIG. 2 with two times 180 degrees turn, according to some embodiments.

FIG. 4 includes front view of a blade with a two times 180 degrees turns. The central axle (16) is coupled tightly with all airfoils in a stack. The airfoils at the bottom and at the top of the stack appear to have the smallest lengths as they are in perpendicular positions to the plane of the figure. Airfoils (17) and (18) appear to have maximum lengths as they are in parallel positions to the plane of the figure. Airfoil (19) appears to have smaller length than airfoil (17) because its position has an angular shift with respect to the position of (17). Similarly, airfoil (20) appears to have smaller length than airfoil (18) because of an angular shift. The airfoils in the stack are positioned with incremental angular shifts around the central axis and the sum total of all these angular shifts equals two time 180 degrees or 360 degrees.

Figure 5:
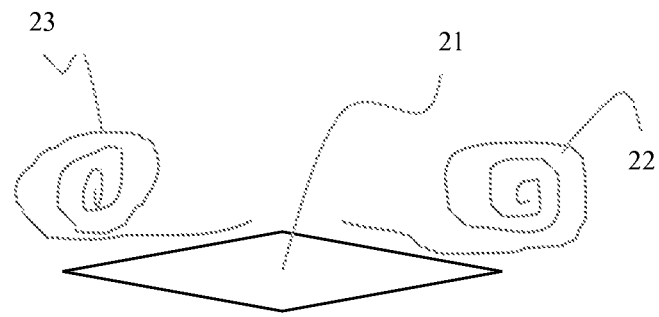
FIG. 5 is a partially schematic side view of an airfoil in FIG. 1 with vortexes of airflow created, according to some embodiments.
Figure 6:
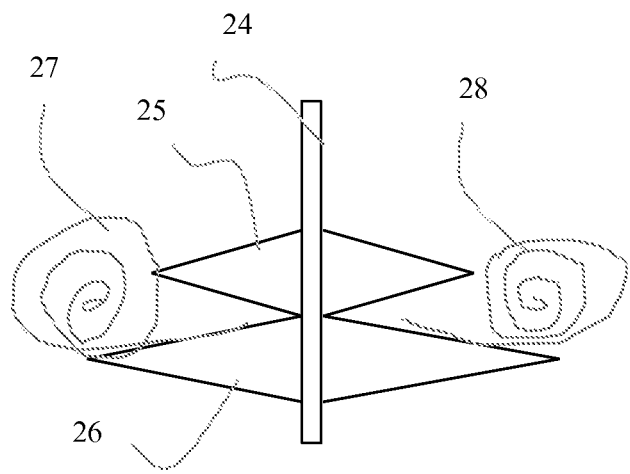
FIG. 6 is a partially schematic side view of two airfoils arranged in a stack with vortexes of airflow, according to some embodiments.

A preferred embodiment of this invention includes vortex of airflow created at tapered edges of airfoils leading to unique aerodynamic characteristics of a blade. For an airfoil in motion, vortex (22) of airflow is created at right hand tapered edge and vortex (23) of airflow is created at left hand tapered edge of airfoil (21) in FIG. 5. A vortex is formed in the air adjacent to the trailing edge of an airfoil as it is accelerated from rest in air. These embodiments, offered only to exemplify specific inventions, are shown and described in sufficient details. Those skilled in the art will understand already known theories of vortex creation by a moving airfoil with respect to speed and angle of attack. A vortex leaves an airfoil in motion and remains (nearly) stationary in the flow. It decays through the action of viscosity in air. Whenever the speed or angle of attack of an airfoil changes there is a corresponding amount of vorticity deposited in the wake behind the airfoil. This exemplary invention is described further by vortex of airflow created by airfoil (26) strongly coupled to central pipe (24) in FIG. 6 where airfoil (25) is positioned right above airfoil (26) with an angular shift sharing same central pipe in a stack. Airfoil (26) in motion creates vortex of airflow (27) and (28) at two tapered edges adding forces in the direction of rotations for airfoil (25) thereof. In a stack of airfoils sharing same central axis in a blade, vortex of airflow created in each airfoil will add forces in the direction of rotation resulting into reduced stall and an overall increased efficiency for the system.

Figure 7:
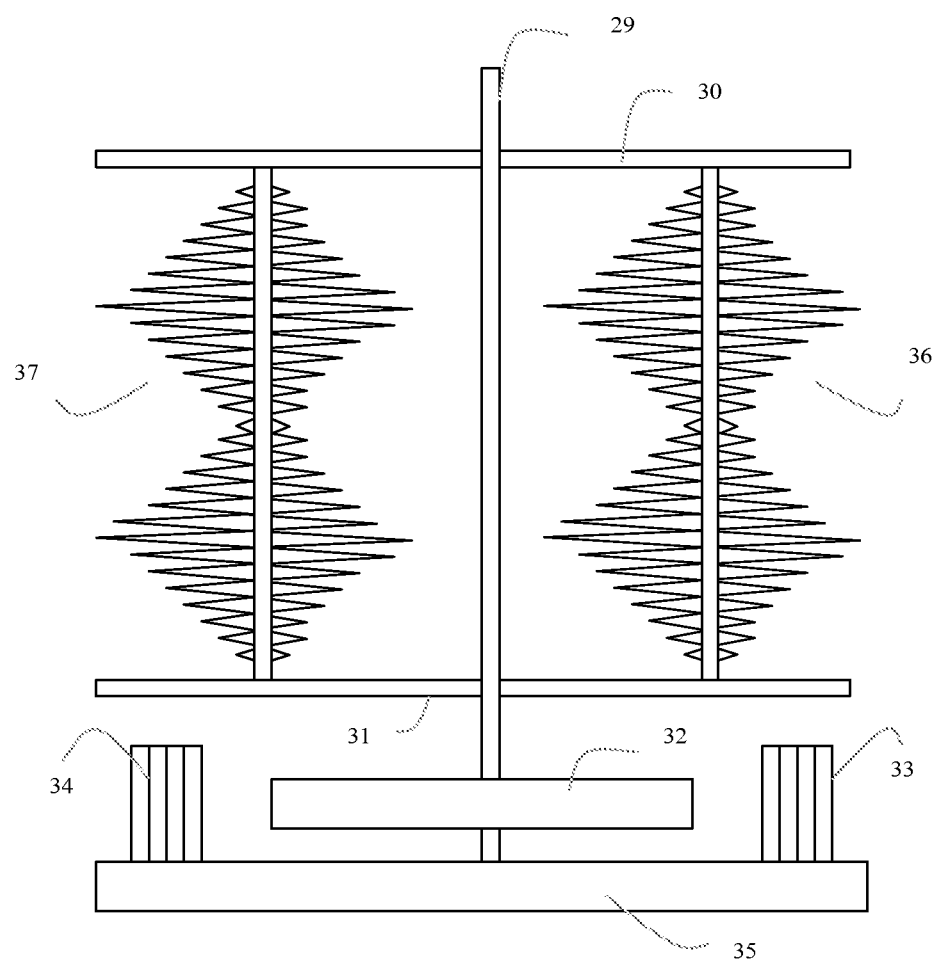
FIG. 7 is a partially schematic front view of the overall wind powered generator system, according to some embodiments.

The apparatus in a preferred embodiment includes a vertical axis wind turbine. As best seen in FIG. 7 a stationary platform (35) supports the rest of the wind turbine system. A platform pipe or an axle (29) is supported by stationary platform (35). The axle (29) is an axis for rotational portion of the apparatus. The stationary platform (35) includes a circular elevated ring with electric wires wound around it (not shown) centered on the geometric centerline of the platform axle (29). Cross sections (34) and (33) of this circular ring with electric wires wound around it are included in a front view of the overall apparatus. Electric wires around this circular ring generate electricity as magnetic fields change from rotating magnets. Two magnets perpendicular to each other are strongly coupled to the central rotating axle (29). Rectangular side view (32) of one such magnet is included in FIG. 7 whereas another magnet of similar shape (not shown) exists in perpendicular position to (32). As the axle (29) rotates, these magnets rotate creating variations in magnetic fields which result into electric current generation in electric wires wound around the circular ring (shown only by the cross sections (34) and (33)) thereof.

The rotating parts of the apparatus include a plurality of helical shaped blades with serrated edges (37) and (36) mounted uniformly about the circumference of the power ring base (31) shown in FIG. 7. The power ring base (31) and power ring top (30) are of same dimensions and are strongly coupled to the central pipe or central axle (29) in order to rotate with the central axle. The power ring base (31) and power ring top (30) have circular contours close to the circumferences of these power rings. These circular contours are concentric and have the geometric centers thereof coincident with the geometric centerline of the platform pipe (29) in the preferred embodiment. There are holes in relative positions along these circular contours to strongly couple central pipes of blade (37) and blade (36) in the preferred embodiment. The rotating parts of the apparatus include a plurality of helical shaped blades with serrated edges rotating with the central axle (29) under wind energy generating electricity in wires wound around the circular ring (shown only cross sections (34) and (33)) in the stationary parts of the apparatus thereof.

Figure 8:
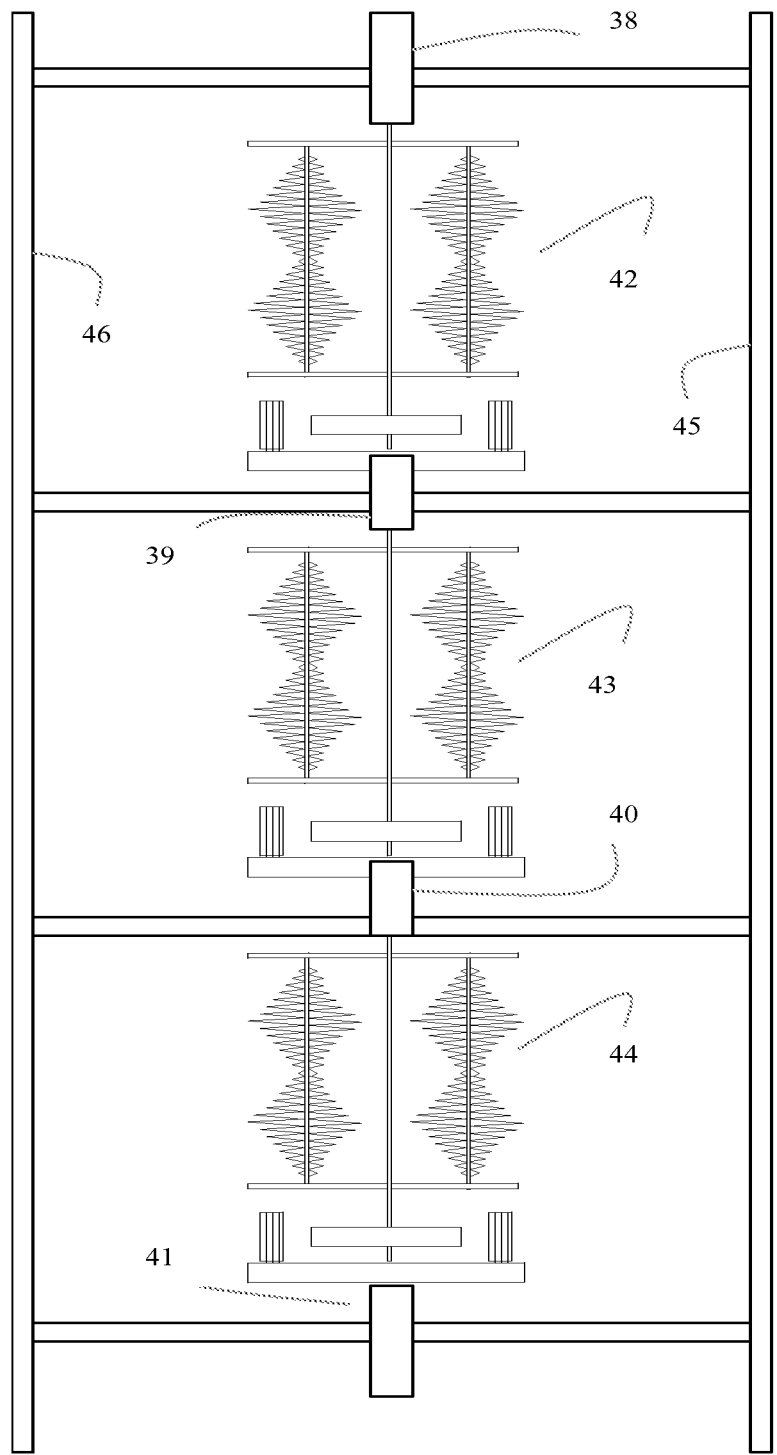
FIG. 8 is a partially schematic front view of a sequence of vertically arranged wind powered generator system modules sharing the same vertical axis, according to some embodiments.

A preferred embodiment of this invention includes a modular system of construction of an expandable vertical axis wind turbine system where a plurality of smaller vertical axis wind turbines (42), (43) and (44) are placed respectively in a vertical sequence sharing the same vertical axis in FIG. 8. Smaller vertical axis wind turbine systems are connected using coupling systems (38), (39), (40) and (41). These coupling systems provide facilities to couple a stationary part of a wind turbine system to a rotating part of another wind turbine system thereof. Each coupling system is strongly coupled with stationary pipe (45) and stationary pipe (46) in FIG. 8. These stationary pipes support the whole complex vertical system. There can be more than two stationary pipes (not shown in FIG. 8) supporting the vertical system. Electricity generated from each smaller wind turbine system is combined with electricity generated from other smaller systems using a single transmission system. This exemplary modular construction of a large vertical wind turbine system improves expandability, manageability and efficiency of electricity generation from wind energy with a smaller footprint.

The embodiments described above are intended only to illustrate and narrate one or more ways of implementing the present invention, not to restrict its breadth or scope. The claims are hereby incorporated into the detailed description, with each claim standing on its own as a separate embodiment.

What is claimed is:

1. A vertical axis wind turbine system, comprising an axle extending along a center axis; a power ring dimensioned and configured for rotational movement having an axis of rotation coincident with the axis of said axle and tightly coupled to the axle so that said power ring can rotate along with the axle; a plurality of helical blades with serrated edges carried on the said power ring about the periphery are placed parallel to the axle around the center axis; each blade comprising: a set of airfoils positioned one above another in a stack wherein each airfoil other than the airfoil at the bottom of the stack, is positioned with a small angle of rotation around the central axis of said blade with respect to the airfoil below it; the said stack of such said airfoils thereby forming a helical shape of blade with serrated edges wherein central axis or each said blade is parallel to the axis of said central axle, the turbine system further comprises:
    a) electric generator strongly coupled to the said central axle to convert rotational energy into electric energy.

2. The vertical axis wind turbine system of claim 1, wherein said airfoils:
    a) have a high quality finish for smooth air flow;
    b) are stacked up with incremental angular rotations around the axis of each airfoil making a complete 180 degrees turn in a single-turn helical shape of blade with serrated edges facing the wind from all directions perpendicular to the said central axis;
    c) are stacked up with incremental angular rotations around the axis of each airfoil making multiple complete 180 degrees turn in a multiple-turn helical shape of blade with serrated edges facing the wind from all directions perpendicular to the said central axis;
    d) have smooth surfaces facing the wind at various angles of attack and creating vortexes of air flow at the edges of each said airfoil generating additional forces along the direction of rotation on airfoils positioned with an angular shift around the central axis right above the said airfoil in a stack;
    f) create additional forces along the direction of rotation of the wind turbine reducing stall and increasing efficiency;
    g) are in a stack increasing efficiency at lower wind speed.

3. A wind turbine system comprising two or more modular vertical axis wind turbine systems of claim 1, positioned for coupling or de-coupling with a shared central axis and arranged in a vertical sequence in close proximity of each other; wherein
    a) at least one vertical axis wind turbine module creates vortexes of air flows generating forces in the rotational direction of at least one other vertical axis wind turbine module located at next higher level in close proximity of said wind turbine sharing same central axis;
    b) said modules of vertical axis wind turbines in an expandable vertical sequence generate forces in the rotational direction, reduce stall and increase efficiency.

* * * * *